United States Patent
Kapoor et al.

(10) Patent No.: US 12,373,470 B2
(45) Date of Patent: *Jul. 29, 2025

(54) STRING SEARCH STRUCTURES WITH EMBEDDED RANGE SEARCH STRUCTURES

(71) Applicants: Sanjiv Kapoor, Naperville, IL (US); Ophir Frieder, Chevy Chase, MD (US)

(72) Inventors: Sanjiv Kapoor, Naperville, IL (US); Ophir Frieder, Chevy Chase, MD (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/209,847

(22) Filed: Jun. 14, 2023

(65) Prior Publication Data

US 2023/0325419 A1 Oct. 12, 2023

Related U.S. Application Data

(63) Continuation of application No. 17/394,078, filed on Aug. 4, 2021, now Pat. No. 11,741,137, which is a continuation-in-part of application No. 15/276,022, filed on Sep. 26, 2016, now abandoned.

(51) Int. Cl.
*G06F 16/31* (2019.01)
*G06F 16/3332* (2025.01)
*G06F 16/335* (2019.01)
*G06F 16/38* (2019.01)

(52) U.S. Cl.
CPC ........ *G06F 16/322* (2019.01); *G06F 16/3335* (2019.01); *G06F 16/335* (2019.01); *G06F 16/38* (2019.01)

(58) Field of Classification Search
CPC .... G06F 16/322; G06F 16/38; G06F 16/3335; G06F 16/335
See application file for complete search history.

(56) References Cited

U.S. PATENT DOCUMENTS

| | | | | |
|---|---|---|---|---|
| 5,963,956 | A * | 10/1999 | Smartt | G06F 16/2264 707/999.102 |
| 6,470,344 | B1 * | 10/2002 | Kothuri | G06F 16/283 707/696 |
| 7,689,621 | B1 * | 3/2010 | Huber | G06F 16/29 707/743 |
| 9,965,793 | B1 * | 5/2018 | Hasan | G06F 16/24561 |
| 2003/0004938 | A1 * | 1/2003 | Lawder | G06F 16/2264 |
| 2004/0249809 | A1 * | 12/2004 | Ramani | G06F 16/5854 |

(Continued)

OTHER PUBLICATIONS

Castelli, Cotober 4, 2001, "Multidimensional Indexing Structures for Content-Based Retrieval", pp. 1-27 (Year: 2001).*

(Continued)

*Primary Examiner* — Matthew J Ellis

(57) ABSTRACT

A method in a data processing system and apparatus for organizing electronic data, structured or unstructured, of one or more users stored across one or more server computers into structures on a recordable medium of a data processing system. The data items are structured in a heterogeneous string structure, and one or more embedded n-dimensional range structure within the heterogeneous string structure. Searching the plurality of string structures can then be done with a query including at least one term and a range threshold. Each data item is associated with a scoring function that is used to filter and rank the matched results.

20 Claims, 6 Drawing Sheets

(56) References Cited

U.S. PATENT DOCUMENTS

2005/0071349 A1\* 3/2005 Jordan .................. G06F 16/283
2012/0041955 A1\* 2/2012 Regev ................... G06F 16/355
707/E17.089

OTHER PUBLICATIONS

Tian et al. "A Fast Location Service for Partial Spatial Replicas", https://www.researchgate.net/profile/Philip_Rhodes3/publication/221547936_A_Fast_Location_Service_for_Partial_Spatial_Replicas/links/540882f00cf23d9765b3981d.pdf, 2011 (Year: 2011).\*

\* cited by examiner

STRING SEARCH STRUCTURES WITH EMBEDDED RANGE SEARCH STRUCTURES

CROSS REFERENCE TO RELATED APPLICATIONS

This application is a continuation of U.S. application Ser. No. 17/394,078 filed on 4 Aug. 2021, which is a continuation in-part of U.S. application Ser. No. 15/276,022 filed on 26 Sep. 2016.

BACKGROUND OF THE INVENTION

Field of the Invention

This invention is directed to improving searching and/or organizing electronic data in a data processing system or web site.

Discussion of Related Art

Electronic data are commonly classified or organized by keywords, such as metalabels based upon the content of the electronic data. The electronic data may also include geographic information, such as a location or size information. For example, pictures taken by a drone can have geographic information (e.g., latitude/longitude position) in addition to content (e.g., a mountain or a building). The electronic data can alternatively or additionally have content dimension information (e.g., mountain or building size). The geographic information can be useful for organizing and searching the data more efficiently. There is a need for an improved method for organizing and searching files or other data on a computer or web site, as well as organizing the search results. A classic example is the organization of files in a file system.

SUMMARY OF THE INVENTION

A general object of the invention is to provide an improved method for organizing and searching for data on a computer-readable recordable medium, and the apparatus and/or program code(s) for carrying out the method in a data processing system.

The general object of the invention can be attained, at least in part, through a method in a data processing system of searching electronic data items that are on a recordable medium of the data processing system. The invention provides heterogeneous string structures, namely identifiers encoded as strings, combined with range structures that additionally may provide a discrete or continuous range of values for attributes. The invention includes a computer-implemented method for organizing electronic data that includes: automatically structuring the data in a heterogeneous string structure, such as a plurality of user-defined metalabel hierarchical structures discussed herein; and automatically embedding one or more n-dimensional range structure within the heterogeneous string structure. The n-dimensional range structure can include at least one of coordinates or dimensions, such as, for example, a three-dimensional range structure and/or a geometric range, with a minimum or maximum value.

The invention includes a computer-implemented data structure comprising a heterogeneous string structure with one or more embedded n-dimensional range structures within the heterogeneous string structure. The heterogeneous string structure can be any suitable structure, such as a tree structure. The n-dimensional range structure is embedded at a node of the tree structure, and desirably each of a plurality of n-dimensional range structures is at one of a plurality of nodes of the heterogeneous string structure. In embodiments of this invention, further heterogeneous string structure nodes can be at leaves of the n-dimensional range structure.

The heterogeneous string structure can be embodied as a Trie or in a generic database that allows for searches over strings and provides links to other search structures. In some embodiments, the heterogeneous string structure includes metalabels for a plurality of hierarchical organization of the data, each data item identified by a user-defined metalabel in the hierarchical structures, and each of the data items organized in both a first data structure and the additional hierarchical structures without replicating the data.

The range structures can be embodied via K-D trees or other geometric search structures, like range trees with all its variations (including efficiency improving mechanism like fractional cascading) that allow for searches over the range structure.

The method and file structures of this invention are beneficial for improving search efficiency. In embodiments of this invention, the method includes receiving a search query with metalabel terms and dimensional values; and searching for user-defined metalabels matching the search query and the dimensional values. As an example, the dimensional values can be a geometric range, such as including a minimum and/or maximum value or any computable function on the values.

The electronic data can be or include any suitable electronic data, such as, without limitation, data items, links to data, electronic files, web site members, or websites. The electronic data are desirably identified by, for example, a member identification, filename and/or domain address The invention further includes a computer-readable storage medium encoded with instructions for organizing data via a data processor. The encoded instructions include instructions for structuring the data in a string structure, and instructions for automatically embedding an n-dimensional range structure within the string structure. The method of this invention is desirably executed and implemented in a data processing system by software program code that is desirably stored on a computer-readable medium, such as a hard drive, in combination with a data processor and any required network interface/connection.

In some embodiments of this invention, a tree structure organizes user-defined metalabels, and the method further includes instructions for establishing a plurality of hierarchical structures for the data. Each data item is identified by a user-defined metalabel in the hierarchical structures, and each of the data items is organized in both a first data structure and the additional hierarchical structures without replicating the data. The method further includes instructions for assigning a corresponding user-defined metalabel and/or range structure to each of the data items, and automatically organizing the data items as a function of the metalabels and/or range structures into the additional hierarchical structures by linking the metalabel and/or range structure of a first data item to a matching metalabel and/or range structure assigned to a second data item. The first structure and the additional hierarchical structures exist simultaneously for the data, and each of the additional hierarchical structures comprises a plurality of nodes, each of the nodes corresponding to one of the user-defined metalabels or an n-dimensional range structure.

DEFINITIONS

Figure 1:
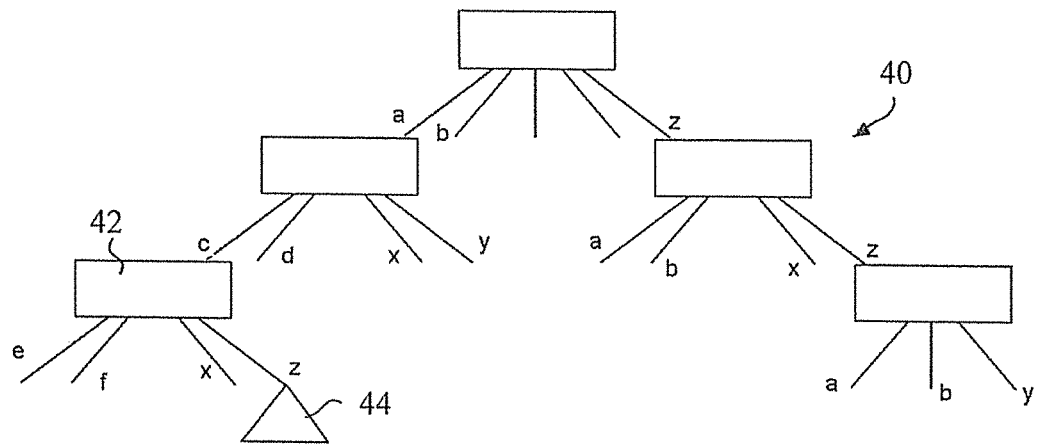
FIG. 1 shows an exemplary trie with an embedded 3-D range structure, according to one embodiment of this invention.

Within the context of this specification, each term or phrase below will include the following meaning or meanings.

References herein to "string structure" are to be understood to refer to a collection of strings over an alphabet. The string structure could be arbitrary or can define a tree structure, also termed a hierarchical string tree structure, as in the case of hierarchical metalabels. Hierarchical metalabels are strings separated by delimiters, e.g. "/". An example of a string structure is: {Diabetes, Coronary, Diabetes/Coronary/hypertension}

References herein to "range structure" are to be understood to refer to an ordered set of values, over which a range query can be performed. Range parameters can be single-dimensional or multi-dimensional, together referred to as n-dimensional. An example of a single dimensional range structure is <length: (1,100)> that defines a range of integers between 1 and 100 units of the parameter length. Another example could be an ordered set of values, e.g., values chosen from the set of two {2,3,5,8,13}. Multi-dimensional range structures can be obtained from single dimensional range structures, using cross product operations.

References herein to "range-string" are to be understood to refer to a sequence of strings and range parameters, separated by delimiters (in the examples below/is used as a delimiter)

(1) Example 1 red/length=<length>/brick/width=<width>.

that can be used to specify an object with characteristics of being red, of being brick and having the specified width and length.

(2) Example 2 length=<length>/width=<width>/red/brick

References herein to "metalabel" are to be understood to refer to a range-string identifier given to a data item, electronic file, web page, or web site member in addition to one identifier of the data item, file's filename and/or file path, a web page's domain address, or the web site member's member identification name. A metalabel of this invention can include any combination of characters, e.g., letter, symbols, emoji, or numbers, and desirably includes a term that a user identifies with the data item, file web-page or web site member. Range-string structure can define a tree structure.

References herein to "user" are to be understood to not be limited to a creator of an electronic file, but can be any person, process, or autonomous software agent, as known in the art, acting on behalf of a user having access to the electronic files.

In one embodiment, used as an illustrative example, references herein to a "first hierarchical structure" or a "traditional hierarchical structure" are interchangeable and to be understood to refer to the already existing directory tree structure commonly used in organizing electronic files in data processing systems. The first or traditional hierarchical structure generally includes a plurality of directories and subdirectories, and individual files are given a filename and a file's placement in the tree structure as identified by a file path.

In the same above embodiment, references herein to the "second hierarchical structure" or "additional hierarchical structure(s)" of this invention are interchangeable and to be understood to refer to a different hierarchical data structure or a file system than the first or traditional hierarchical data structure or file system, such as the abstract hierarchical structures described in U.S. Pat. No. 7,720,869 and all related patents and patent applications, herein incorporated by reference.

References herein to "abstract directory" are to be understood to refer to a directory in or created for the second hierarchical file structure of this invention.

DESCRIPTION OF PREFERRED EMBODIMENTS

The present invention provides a method in a data processing system, e.g., a computer, for organizing and of searching electronic data on a recordable medium of one or more data processing systems, e.g., computer hard drives or flash drives. It is important to note that this invention is not limited to a recordable medium that is physically adjacent to a computer. Instead, it is also within the scope of this invention that some and possibly all of the data items, web-site members or files reside in remote locations whose access is via a network including but not limited to such networks as local area networks, wide area networks, private virtual networks, ad hoc networks, and the Internet.

The method of this invention improves searching for electronic data in, for example, current existing hierarchical structures, such as are formed of the directories and subdirectories currently employed in operating systems. In such traditional hierarchical structures, often referred to as tree structures, each of the electronic files, data items, web site members, or web pages includes, for example, a given filename, member identification, or domain name, respectively, that is seen by the user through a user interface, e.g., computer monitor, and a file path identifying the location within the hierarchical file structure. The electronic data can be additionally or alternatively organized in one or more additional heterogeneous string structure based upon user-defined terms or metalabels.

Embodiments of this invention automatically embed an n-dimensional range structure within a heterogeneous string structure. The n-dimensional range structure can include at least one of coordinates or dimensions, such as to give the electronic data a geographic context. In embodiments of this invention, the range includes a minimum or maximum value, and provides for searching for electronic data matching a search query with metalabel terms and dimensional values. As discussed above, the embedded hierarchies are also implemented by encoded software instructions executable by a data processor.

As an example, consider a drone system, used for photography or surveillance, for classifying the terrain. Every object in the terrain can be classified by its coordinates as well as by its recognizable features. There are thus location parameters<loc> where loc=(x,y,z) as well as feature parameters specified in the set {<par1>, <par2> . . . <par k>} where <par m> is the value of <feature m>.

Each of these features, as well as the location parameters, can be used to further define corresponding electronic data. String structures composed from these parameters can be used to identify objects during the flight path of drones and allow terrains to be classified. A search on the feature space allows identification of locations and/or allows for extraction of features based on the location parameters. Weights on the feature space can indicate the importance of the object. Geographic tagging according to this invention has applications, for example, to GIS as well as path planning for drones or other manned/unmanned flights.

Geometric range searches can be used when there are k dimensions or, generally speaking, attributes. Examples of these attributes include height, width, length, latitude, longitude, etc. These searches can be merged into a hierarchy of this invention, such as a trie for keyword search by embedding any embodiment of range search structures (k-D trees or range search trees) at the nodes of the hierarchy when searching over the attributes. Embodiments of this invention thus include a data structure that is a combination of geometric search and a string search mechanism.

FIG. 1 shows, as an example, a trie 40 with an embedded 3-D range structure 44 at node 42. The 3-D range search in conjunction with search over strings illustrated in FIG. 1 is one example of a conjunctive data structure according to embodiments of this invention. The data structure provides for searching when the geometric data are presented as one 3-dimensional parameter. Thus, for example, data that are classified by <Typeof Structure>/<ConstructionMaterial>/<Size_parameters> can be searched.

As an example consider building data classified as
Bridge/Cement/A1 (height=100 ft, length=200 ft, width=50 ft)
Building/Steel/B1 (height=150 ft, length=80 ft, width=50 ft)
Building/Wood/B2(height=50 ft, length=50 ft, width=40 ft)
Tower/Steel/T1 (height=100 ft, length=20 ft, width=20 ft)
as well as:
Steel/Building/B1 (height=150 ft, length=80 ft, width=50 ft)
Steel/Tower/T1 (height=100 ft, length=20 ft, width=20 ft)
Wood/Building/B2(height=50 ft, length=50 ft, width=40 ft)
Cement/Bridge/A1 (height=100 ft, length=200 ft, width=50 ft)

The above data can be searched with the following query: "Find all structures in Steel/* with height<=100 ft, length<=80 ft, width<=50 ft". This will resolve to return:
Steel/Tower/T1 (height=100 ft, length=20 ft, width=20 ft) using the trie structure followed by the range search.

Figure 2:
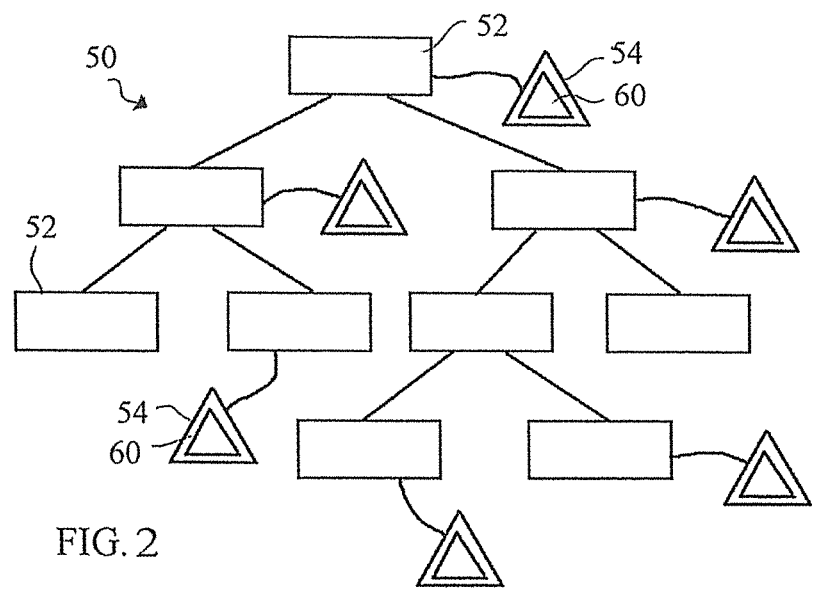
FIG. 2 shows an exemplary trie with embedded 3-D range structures, according to one embodiment of this invention.

Hierarchies can additionally be formed that allow for the geometric parameters to be separable. For example, if one classifies buildings located with x and y-coordinates within a certain range and then distinguishes by type of buildings, material of buildings etc. and subsequently by the height (z-parameter) in the hierarchical metalabel then the search structure could be constructed with these search structures interspersed. FIG. 2 shows a trie 50 with nodes 52 that include as 'nodes', for example, 3, 2 or 1-dimensional range search data structures 54, as appropriate, followed by additional trie structures 60 at the leaves of the range search trees 54.

The hierarchy of FIG. 2 can be used in searches in the following example set of metalabels: <Construction Material>/<height-range>/<Typeofstructure>/<length and width range>. Thus a query: "Steel/<height greater than 60>" reports:
Steel/Building/B1 (height=150 ft, length=80 ft, width=50 ft)
Steel/Tower/T1 (height=100 ft, length=20 ft, width=20 ft)
Other variations or combination of height, length and width can be used.

The embedded range structures of this invention can be incorporated into any string structure, such as an additional file and/or data organization system that extends the data/file organization into a multi-hierarchy user defined system. The additional hierarchical structures of this invention can be abstract data structures, as they exist in the background and are not conventionally viewed through a user interface like the traditional file directories, subdirectories, and filenames. In the system of this invention the data are organized into multiple hierarchical forms which aid considerably in searching and organizing search results, i.e., files, in a structured fashion.

Figure 3:
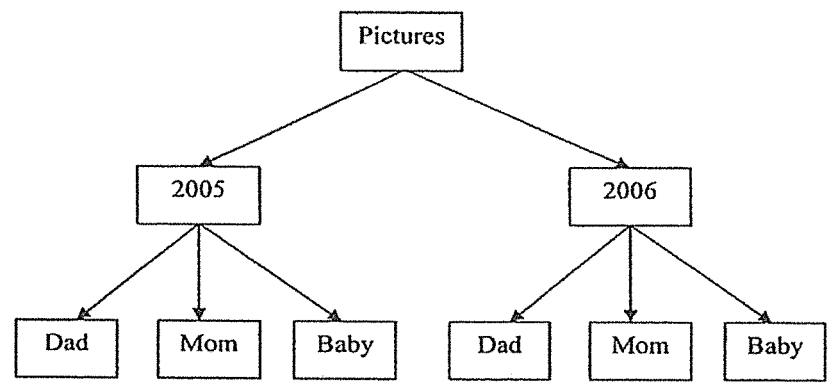
FIG. 3 is a simplified representation of traditional hierarchical structure.
Figure 4:
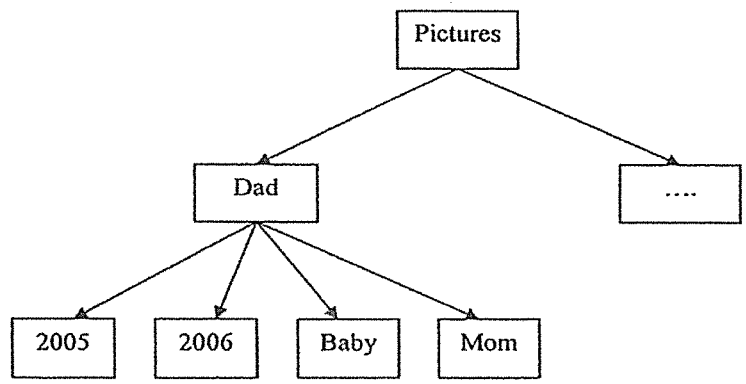
FIG. 4 is an exemplary abstract directory structure adapted from the traditional hierarchical file structure of FIG. 3, according to one embodiment of this invention.

As an example consider the following structure (directories/subdirectories) of electronic files, represented in FIG. 3.
Pictures/2006/Dad
Pictures/2005/Dad
Pictures/2006/Mom
Pictures/2005/Mom
Picture/2006/Baby
Pictures/2005/Baby If a user wanted to access all files which involve dad, even files not having "Dad" in the filename but including dad in the picture, the number of files may be substantial and spread among multiple subdirectories. Thus, if you were looking for all dad-related pictures, it would be desirable that these pictures may be classified as below, and as shown in the abstract directory structure of FIG. 4.
Pictures/Dad/2005
Pictures/Dad/2006
Pictures/Dad/Baby
Pictures/Dad/Mom Metalabel hierarchies provide, in a general sense, multiple organizational tree structures for the same electronic files in addition to the traditional file directory tree structure. These additional hierarchical structures can be provided by structuring the electronic files in one or more abstract directories according to user-defined metalabels. When the user searches based upon an assigned metalabel, the program code implementing this invention provides the corresponding electronic files in a new file directory, such as shown in FIG. 4. As the directory of FIG. 4 exists as a result of wanting all pictures identified by the metalabel "dad", the directory of FIG. 4 is an abstract directory that is created in response to a query for the "dad" metalabel and exists simultaneously with, and does not replace or alter, the first hierarchical file structure of FIG. 3.

As discussed above, current searching of the electronic files in the traditional hierarchical file structure, as represented in FIG. 3, is typically based upon the filename or other information about the file itself, such as the file type or extension. The method of this invention provides a second hierarchical file structure, and desirably a plurality of additional hierarchical structures. These additional hierarchical structures are "abstract" in that they remain in the background, do not require a physical presence that is directly accessible to the user through the user interface, as does the first hierarchical file structure, but may be viewable in a similar fashion. The abstract additional hierarchical structures supplement, and do not replace or replicate portions of, the first hierarchical file structure to improve searching of the electronic files in the hierarchical file structure.

In one embodiment of this invention, each of at least a portion of the electronic files stored in one or more data processing systems is assigned a user-defined metalabel. The computer code that implements all or portions of the method of this invention receives the user-defined metalabel, such as through a keyboard, and assigns the metalabel to the intended electronic file. The metalabel does not supplant the file name or file path of the electronic file.

The metalabel provides users with the possibility to describe or annotate a file with user defined words and/or numbers, which allows another way to search for the files. The electronic files are searched by querying the metalabels. For example, the data processing system receives a query from a user, searches the metalabels of the second hierarchical file structure according to the query, and returns to the user the search results, which include the electronic file or files including a metalabel matching the query. In one embodiment, the search results are provided in or by an abstract directory structure, such as illustrated in FIG. 4. The query can include the full or a portion of the metalabel. In one embodiment of the invention, the query can include a portion of the metalabel coupled with a wildcard symbol, such as, for example, an asterisk or other character, to represent one or more letters or numbers.

In one embodiment of this invention, a program code organizes the electronic files as a function of the metalabels into a second hierarchical file structure existing simultaneously with the first hierarchical file structure on the recordable medium of the data processing system. A plurality of metalabeled electronic files are organized into one or more additional hierarchical structures by linking each metalabel of the electronic files to a matching metalabel assigned to one or more of the other electronic files. Each metalabel that is assigned to an electronic file is linked to a matching metalabel, should such a matching metalabel exist, of an other electronic file. The link between the metalabels remains even when one or more electronic files are, for example, moved or given a new file name. The additional file structures provided by the metalabels are desirably automatically updated when, for example, an electronic file is moved within, modified, copied, or deleted from the first and traditional hierarchical file structure.

In one embodiment of this invention, hierarchical metalabels have the form:
(i)<metalabel> or
(ii)<metalabel1>1<metalabe12>/ . . . <metalabelk>.

Figure 5:
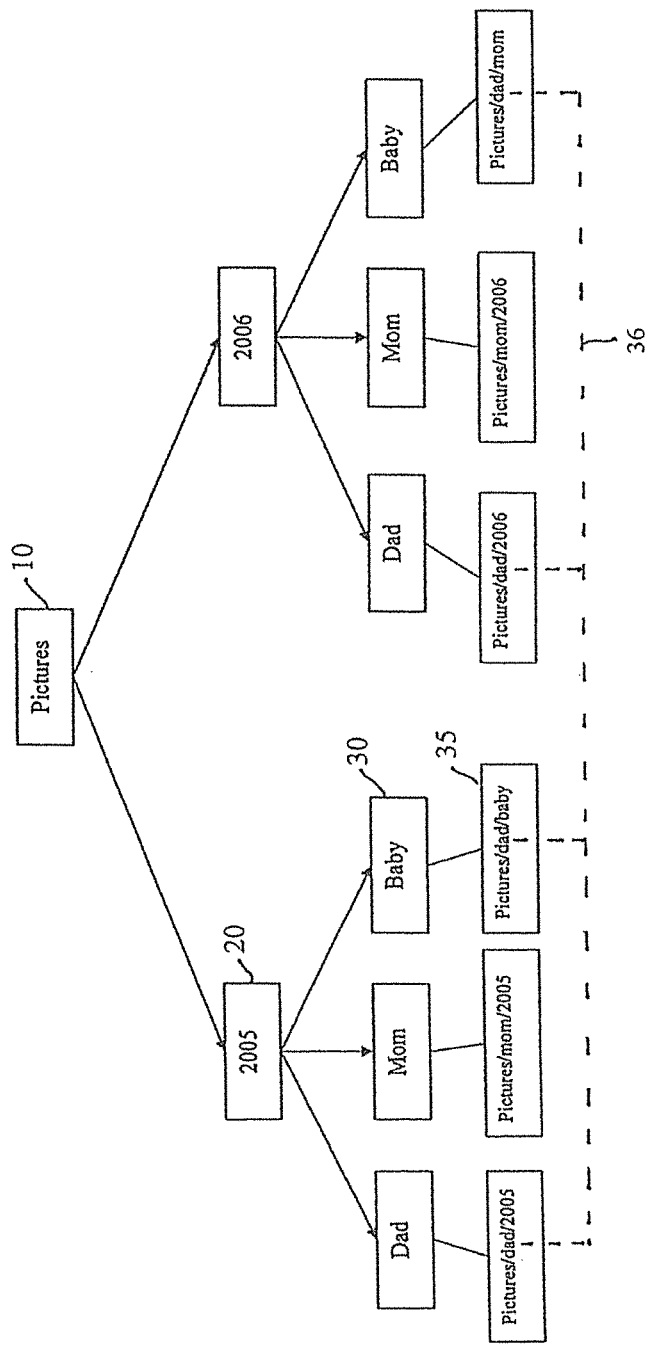
FIG. 5 represents a simplified application of metalabels to electronic files in the traditional hierarchical file structure of FIG. 3, according to one embodiment of this invention.

Metalabel form (i) provides a flat result with all the search results in one single abstract directory. Metalabel form (ii) supports structured searching and reporting. As an example referring to the file structure of FIG. 3, the following metalabels could be assigned to electronic files therein as shown in FIG. 5:
Pictures/dad/2005
Pictures/mom/2005
Pictures/dad/baby
Pictures/dad/2006
Pictures/mom/2006
Pictures/dad/mom A query for "Pictures/" would provide an abstract directory with the subdirectories "dad/" and "mom/" and the search for "Pictures/dad" would provide an abstract directory with the subdirectories "2005/", "2006/", "baby/", and "mom/". In general, a search for <Dir>/ provides all files labeled <Dir>/<file> and all directories, <dir>, of files labeled */<Dir>/<dir>/*. As will be appreciated by those skilled in the art following the teachings herein provided, directories may also be assigned metalabels with the same methodology as described herein for individual files.

The metalabels allow a system user to further describe or label a file according to, for example, the content or purpose of the file. Referring to FIG. 5, the electronic file 35 is in subdirectory 30 named "Baby", which is in subdirectory 20 named "2005", which is in directory 10 named "Pictures". The user, e.g., the file creator, enters a metalabel "Pictures/dad/baby" for the electronic file 35. In this example, the electronic file 35 is a picture that includes both dad and baby, and while the placement in the traditional file structure places the electronic file in the "Baby" subdirectory 30, associating the metalabels "dad" and "baby" allows the computer to link this file with other similar metalabeled files in other subdirectories. As shown in FIG. 5, the dashed line 36 indicates the linking for the metalabels "dad". Thus, a query of the metalabel "dad" provides as search results the linked files. As discussed above, the abstract directories resulting from the query for metalabel "dad" would be "2005/", "baby/", "2006/", and "mom/" as illustrated in FIG. 5.

Figure 6:
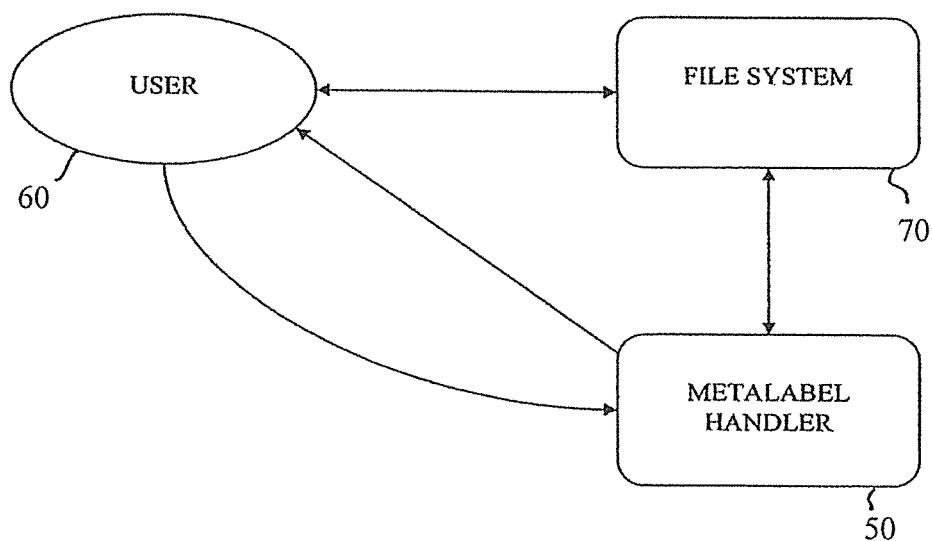
FIG. 6 is a representation of the interaction between the user and the hierarchical system according to one embodiment of this invention.

A metalabel handler module or functionality, desirably implemented as a client-server module, is provided in the data processing system. As represented in FIG. 6, the metalabel handler 50 interacts with the user 60 to manage the user's metalabel manipulations, including commands such as add, modify, copy, and remove metalabels for files. The metalabel handler 50 also desirably implements the metalabel search functions of this invention. The metalabel handler 50 interacts with the existing traditional hierarchical file structure, i.e., file system 70, to serve the requests from the client, user 60, and make the requested modifications to update the additional hierarchical file structure(s) whenever an electronic file is moved, copied, or deleted.

The additional hierarchical structures can be implemented as tries, and desirably Patricia tries. In this embodiment electronic files are organized into a second hierarchical file structure by locating or creating a node in the trie that is identified with the metalabel and/or range structure of the file and associating the filename to the metalabel in the trie. As an alternative, and more desirably used in combination in the double trie structure discussed below, organizing the metalabel and/or range structure into the second hierarchical file structure is accomplished by locating or creating a node in the trie that is identified with the filename and associating the metalabel and/or range structure to the filename in the trie.

Figure 7:
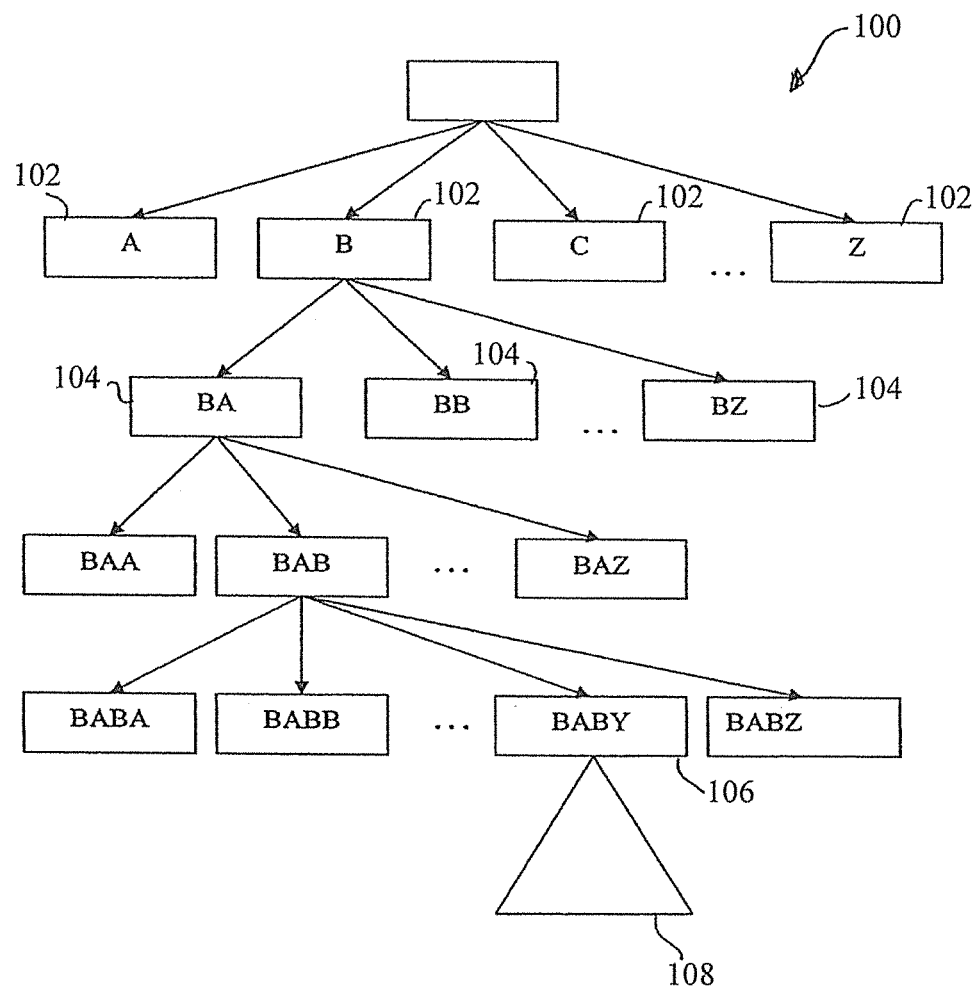
FIG. 7 is a theoretical trie structure for illustrative purposes.

FIG. 7 illustrates a general hypothetical trie structure 100 to provide a preliminary understanding to assist in the explanation of the subject invention, and is not intended to limit the invention in its application. In the hypothetical trie structure 100 of FIG. 7, there is a node 102 available for each letter of the alphabet. Note that herein the approach is illustrated using an English language character set, but one skilled in the art will recognize that any character and/or symbol set is possible. Referring to the node for "B", each node 102 will connect to a further plurality of available nodes 104 representing "B" plus a further letter, i.e., "BA"-"BZ". The trie structure of FIG. 7 continues in this manner and ultimately provides the node 106 for "BABY". According to this invention, the "BABY" node 106 contains the electronic files, and more accurately, the filenames and file paths of the electronic files, associated with the metalabel "BABY". The electronic files are represented in FIG. 7 by triangle 108. Thus, when a new file and/or metalabel is/are added, the data processing system organizes the metalabel into the trie structure of the additional hierarchical file structure and associates the filename with a corresponding node. The electronic file is desirably not duplicated.

Figure 8:
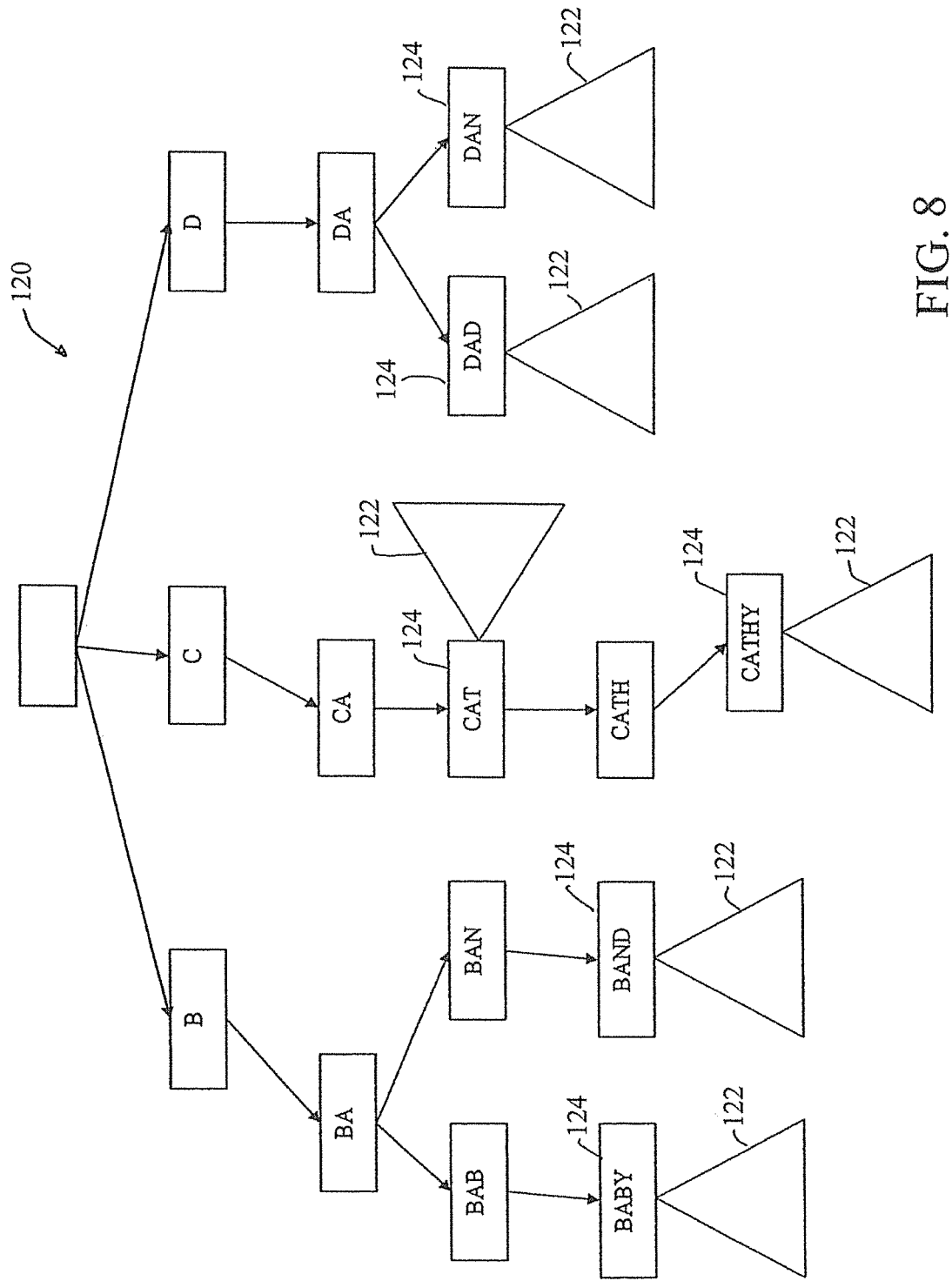
FIG. 8 illustrates a multi-user file structure according to one embodiment of this invention.

As will be appreciated by those skilled in the art following the teachings herein, the trie structure of FIG. 7, for preliminary explanation purposes contains nodes for potentially all combination of letters. In actual implementation, trie structures contain nodes according to need, such as illustrated in FIG. 8. FIG. 8 is an example illustration of a trie structure 120 for the metalabels "BABY", "BAND", "CAT", "CATHY", "DAD", and "DAN". In FIG. 8, only nodes related to actual metalabels are present, and unnecessary nodes do not exist. As in FIG. 7, the filenames of the electronic files are represented by triangles 122. Each triangle 122 is attached to one of the metalabel nodes 124, and includes filenames and file paths of the electronic files the user has assigned a metalabel with the metalabel matching the associated node 124.

In one embodiment of this invention, the additional hierarchical file structure is implemented as a double trie structure. Both tries of the double trie structure are desirably Patricia tries. The first trie uses the metalabels as keywords. As shown in FIG. 8, each node of the trie corresponds to a unique metalabel or a range structure. Each node in turn desirably contains an internal secondary trie structure to further store a list of files that have been tagged with the specified metalabel or range information. To provide faster results, the second trie of the double trie structure uses the filenames of the electronic files as the keywords, with the secondary trie structure, represented as the triangles in figures, containing the metalabels of the files.

For each add, copy, modify, and update metalabel command, the trie structures are suitably modified. The file copy, move, and delete commands of a UNIX file system can be modified to create metalabeled copy, metalabeled move, and metalabeled delete commands. These commands modify the trie structures while performing the file system commands.

Thus, the invention provides a computer-implemented data structure having a heterogeneous string structure with an embedded n-dimensional range structure within the heterogeneous string structure. The embedded range structure provides the benefit of improved searching efficiency for geographic or dimensional values.

In another embodiment there is a scoring function associated with each data item that is used to filter and rank the matched data items. In one embodiment this scoring function has as parameters a score indicating the probability that the data item is used when returned as a search result, along with a personalizing score. Based on the two scores, the scoring function evaluates the probability of usage of the data item and reports the data item only when it passes a threshold. This threshold function also exists at each node of the tree structure created from the range-string labels, and the score at each node represents the probability of usage of data items that may be returned with the matched items from the subtree. Using this probability, the search may be filtered, and subtrees rated below threshold may not be reported. This results in efficiency of the search.

In one embodiment, the scoring function is a function of characteristics of the data item or sets of data items represented by the node. This characteristic may be quality, type, price, etc. and user characteristics are learned as a function with these parameters. In one embodiment this function is the probability, measured by frequency counts, that the user clicks on results that have the particular characteristics.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A computer-implemented method comprising a data processor for storing and organizing data using metalabels, the method comprising:
   storing and organizing the metalabels that are range-strings, wherein a range-string comprises an ordered sequence of at least one string and at least one n-dimensional range, each range represented by at least a minimum and maximum value and each string and range separated from preceding string or range by a delimiter;
   storing the data using a plurality of nodes in a range-string tree structure; wherein a plurality of n-dimensional range search data structures is embedded at each of a plurality of nodes of the string search tree structure;
   receiving a range-string search query from a user, wherein the range-string search comprises at least one string term and with at least one n-dimensional value;
   searching via the range-string tree structure for user-defined metalabels matching the string term and the at least one n-dimensional value, wherein the at least one n-dimensional value is matched with one or more range structure nodes in the n-dimensional range structure wherein for each dimension, the range of the range-string query matches by dimensionally falling within or equal to the range of each of the corresponding dimensions at the range structure node; and
   identifying data items at each of the matched range structure nodes;
   returning the identified data items as search results to the user.

2. The method of claim 1 where the data can be a file, web-page or data stored in a data system.

3. The method of claim 1, wherein the n-dimensional range structure comprises at least one of coordinates or dimensions.

4. The method of claim 1, wherein the n-dimensional range structure comprises of a three-dimensional range structure.

5. The method of claim 1, wherein the range structure is searched via a K-D tree or a Range Search Tree.

6. The method of claim 1, wherein a plurality of n-dimensional range tree structures is embedded at each of a plurality of nodes of the string search tree structure.

7. The method of claim 1, further comprising string search tree structure nodes at leaves of the n-dimensional range tree structure.

8. The method of claim 1, wherein the string tree structure is searched via a Trie data structure.

9. The method of claim 1, wherein the dimensional values comprise a geometric range.

10. The method of claim 1, where the delimiter is at least one non-alphanumeric character.

11. The method of claim 1, where the range-tree structure is stored over a network using a plurality of data storage systems.

12. The method of claim 1, wherein the heterogeneous range-string structure comprises a plurality of hierarchical structures for the data, each data item identified by a user-defined metalabel in the hierarchical structures, each of the data items organized in both a first data structure and the additional one or more hierarchical structures without replicating the data.

13. A system comprising a data processor for storing and organizing data using metalabels, wherein the system comprising executable instructions that when executed by the data processor perform instructions:
storing and organizing the metalabels that are range-strings, wherein a range-string comprises an ordered sequence of at least one string and at least one n-dimensional range, each range represented by at least a minimum and maximum value and each string and range separated from preceding string or range by a delimiter;
storing the data using a plurality of nodes in a range-string tree structure; wherein a plurality of n-dimensional range search data structures is embedded at each of a plurality of nodes of the string search tree structure;
receiving a range-string search query from a user, wherein the range-string search comprises at least one string term and with at least one n dimensional value;
searching via the range-string tree structure for user-defined metalabels matching the string term and the at least one n-dimensional value, wherein the at least one n-dimensional value is matched with one or more range structure nodes in the n-dimensional range structure wherein for each dimension, the range of the range-string query matches by dimensionally falling within or equal to the range of each of the corresponding dimensions at the range structure node; and
identifying data items at each of the matched range structure nodes as search results; returning the identified data items to the user.

14. The system of claim 13, where the data can be a file, web-page or data stored in a data system.

15. The system of claim 13, wherein the range structure is searched via a K-D tree or a Range Search Tree.

16. The system of claim 13, wherein a plurality of n-dimensional range tree structures are embedded at each of a plurality of nodes of the string search tree structure.

17. The system of claim 13, further comprising string search tree structure nodes at leaves of the n-dimensional range tree structure.

18. The system of claim 13, wherein the heterogeneous range-string structure comprises a plurality of hierarchical structures for the data, each data item identified by a user-defined metalabel in the hierarchical structures, each of the data items organized in both a first data structure and the additional one or more hierarchical structures without replicating the data.

19. A non-transitory computer-readable storage medium encoded with instructions for organizing data, that when executed via a data processor, perform operations comprising:
storing and organizing the metalabels that are range-strings, wherein a range-string comprises an ordered sequence of at least one string and at least one n-dimensional range, each range represented by at least a minimum and maximum value and each string and range separated from preceding string or range by a delimiter;
storing the data using a plurality of nodes in a range-string tree structure;
wherein a plurality of n-dimensional range search data structures is embedded at each of a plurality of nodes of the string search tree structure;
receiving a range-string search query from a user, wherein the range-string search comprises at least one string term and with at least one n dimensional value;
searching via the range-string tree structure for user-defined metalabels matching the string term and the at least one n-dimensional value, wherein the at least one n-dimensional value is matched with one or more range structure nodes in the n-dimensional range structure wherein for each dimension, the range of the range-string query matches the range of each of the corresponding dimensions at the range structure node; and
identifying data items at each of the matched range structure nodes as search results to the user;
returning the identified data items to the user.

20. The non-transitory computer-readable storage medium encoded with instructions for organizing data via a data processor of claim 19, where the data can be a file, web-page or a data stored in a data system.

* * * * *